March 31, 1953  A. L. BAKER  2,633,050
OPTICAL PLUMMET
Filed Oct. 1, 1949
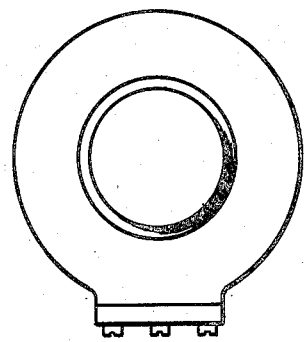
Fig. III
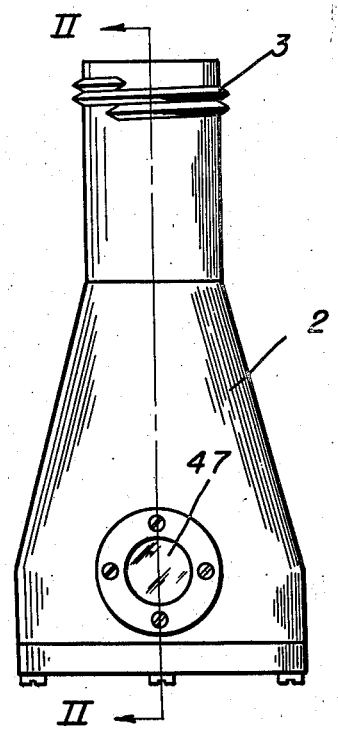
Fig. I
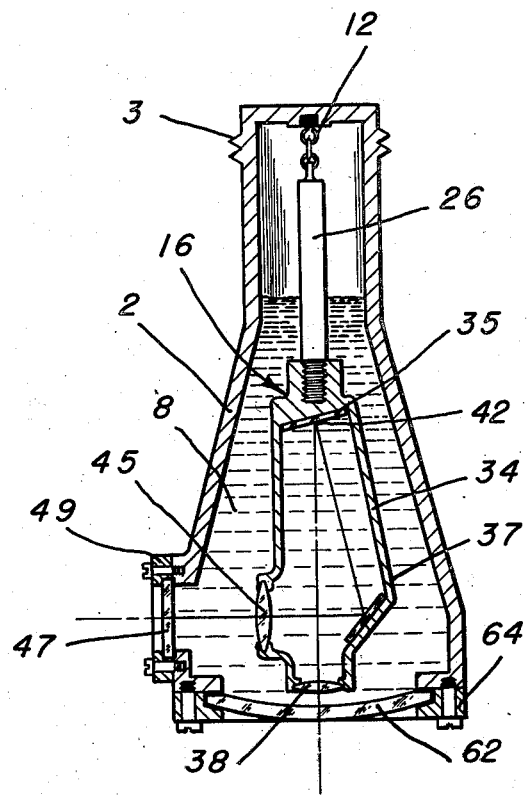
Fig. II
INVENTOR
ALLISTER L. BAKER
BY
ATTORNEY Patented Mar. 31, 1953

2,633,050

UNITED STATES PATENT OFFICE 2,633,050

OPTICAL PLUMMET

Allister L. Baker, Denville, N. J., assignor to Keuffel & Esser Company, Hoboken, N. J., a corporation of New Jersey Application October 1, 1949, Serial No. 119,109

3 Claims. (Cl. 88—2.3)

This invention is for an optical plummet for use by surveyors and the like for setting up an instrument directly over a chosen point. The invention is an improvement over an optical plummet described in a copending application Serial No. 107,238, filed July 28, 1949.

The objects of the invention are to simplify the optical plummet, to reduce the number of parts required, thereby making the plummet less expensive to manufacture, to reduce the chance of dirt lodging on the reticle, to lower the eye position so there is less interference from the tripod used for holding the surveying instrument and to permit the plummet to be used when the instrument is out of level by a considerable amount.

These objects of the invention and the method of their achievement will be more readily understood by reference to the following description taken in connection with the accompanying drawing in which:

Fig. I is a view in front elevation of the optical plummet.

Fig. II is a view in sectional side elevation of the optical plummet taken along the line II—II of Fig. I and looking in the direction of the arrows.

Fig. III is a view in plan of the optical plummet.

Referring to the figures, an enclosure 2 is provided with a thread 3 or other means for attaching the plummet to a surveying instrument or the like.

The thread 3 or equivalent means should also orient the optical plummet to the surveying instrument or other device in a manner to be more fully described.

A pendulum member 16 is mounted within the enclosure 2 so that it is free to swing with respect to the reference point of the instrument. For example, the pendulum member 16 may be suspended from a fine chain 12 or other flexible means. The chain 12 may be secured to the top of the enclosure 2 and to the pendulum member 16 by solder or other convenient means. The chain 12 is oriented so that the pendulum member 16 hangs with the eyepiece 45 facing toward the window 47. Since the links of the chain tend to contact each other at the outermost parts of the loops, the pendulum member 16 will always come to rest with the eyepiece 37 facing toward the window 47. If means other than a chain is used for suspending the pendulum, it will be necessary to provide means to assure that the eyepiece 37 will face the window 47 when the plummet comes to rest.

The pendulum member 16 is formed from two parts. The lower part 34 is preferably made by precision casting because of its complex shape. The upper part 26 is merely a rod joined to the lower part 34 by means of a thread as shown or by other convenient means. The enclosure 2 is also preferably formed by the precision casting process. The mechanical construction of this plummet is accomplished therefore by two precision castings 2 and 34 and one very simple machined part 26. It will be appreciated that this construction is much more simple and less expensive than any construction shown in the previously identified copending patent application.

The lower part 34 of the pendulum member 16 is open at two sides; i. e., the sides parallel to the plane of the paper in Fig. II. It is also provided with an opening at the bottom for an objective lens 38, an opening at the front for an eyepiece lens 45, an inclined surface for a mirror 35 and an inclined surface for a mirror 37. The mirrors 35 and 37 are preferably secured to the inclined surfaces by means of cement. The lenses 38 and 45 may be secured in place by a threaded ring or by burnishing the metal of the part 34 over the lens.

The enclosure 2 is provided with a window 62 (preferably having spherical surfaces concentric with the point of suspension of the pendulum member 16) at the bottom and a window 47 at the front. Light from below the plummet passes through the window 62, through the objective 38 and is reflected from the mirror 35 to the mirror 37. The mirror 37 reflects the light through the eyepiece 45 and the window 47.

A liquid 8 may be provided in the enclosure 2 to damp the swinging of the pendulum so that it will come to rest quickly under the action of gravity. The enclosure 2 must then be sealed so that the liquid 8 will not leak out. The liquid 8 will also fill the space within the lower part 34 of the pendulum member 16. The lenses 38 and 45 should be designed to give the required optical properties with their surfaces in contact with the particular liquid used. If the index of refraction of the liquid changes considerably with temperature it may be desirable to use a triplet objective or other means for preventing excessive parallax as described in the copending application Serial No. 107,238, filed July 28, 1949.

In use, the plummet may be secured vertically below a surveying instrument or the like so that the point about which the pendulum member 16 pivots in a predetermined position with respect to a reference point. In the conventional surveying instrument the reference point will lie on the vertical axis of the instrument at the center of the ball joint about which the instrument is levelled. The threads 3 or other means will in the preferred embodiment bring the axis of enclosure 2 which passes through the pivot point of the pendulum member 16 into alignment with the vertical axis of the surveying instrument. The axis of the pendulum member will then also fall in line with the vertical axis of the instrument when the instrument is levelled. It is not absolutely essential that the pivot point lie directly below the reference point of the instrument provided that the parts are so adjusted that when the pivot point is in a predetermined position with respect to the reference point and when the pendulum member 16 is in equilibrium under the action of gravity, the objective 38 will image a point directly below the reference point in superimposed position on an index mark 42 provided on mirror 35. The reference point will ordinarily be a point of a surveying instrument but it may also be a point on any other instrument or it may be any point with respect to which it is desired to perform a plumbing operation.

If the device is to be used with a surveying instrument, the pivot point (i. e., the point of suspension if a chain is used) should be as high as possible so that the vertical distance between the pivot point and reference point is not great. This distance will introduce a slight error when the surveying instrument is not level.

The index mark 42 may be any type of mark for defining a definite point on the mirror 35. For example, it may consist of two lines intersecting at right angles or it may consist of a small circle. By means of the eyepiece 45 and mirror 37, an observer looking through the window 47 can see the point directly below the reference point superimposed on the index mark 42. The plummet provides means of aligning the instrument over a predetermined point by shifting the instrument with plummet attached until the predetermined point appears superimposed on the index mark when the pendulum member is in equilibrium under the action of gravity. The vertical axis or reference point of the instrument will then be directly over the predetermined point. In practical surveying, the predetermined point may be a city monument, a bench mark or any other point used by the surveyor as a basis for his measurments.

In the construction described, the enclosure 2 may take a bell shaped form as shown. This permits considerable angular movement of the pendulum member 16 without interference from the enclosure. The extent of this permissible angular movement of the pendulum member determines how far the surveying instrument may be out of level and still allow the optical plummet to be used to align the instrument over the predetermined point.

Means may be provided to lock the pendulum member 16 so that it will not swing when it is not in use or resilient means may be provided to reduce the shock caused by movement of the pendulum member during transport of the plummet.

The inclined mirror 35 which is provided with an index mark 42 as has been described serves the double purpose of a reflector and reticle. This simplifies the plummet and reduces the number of parts. In addition, because the mirror 35 is inclined bubbles or any other light foreign matter which rises in the liquid to the mirror will tend to move upward along the inclined surface and eventually rise to the surface of the liquid thereby keeping the focal plane of the optical system clear within the field of view.

What is claimed is:

1. An optical plummet for use with a surveying instrument to indicate when a reference point is vertically over a predetermined point comprising an enclosure, means for securing said enclosure to a surveying instrument, a pendulum member within said enclosure free to swing with respect to the reference point about a point near the top of said enclosure, an objective lens carried by said pendulum member to image a point vertically below the reference point, a first mirror carried by said pendulum memer at the focal point of said objective lens provided with an index mark and inclined to the optical axis of said objective lens, a second mirror carried by said pendulum member and an eyepiece carried by said pendulum member, said first mirror reflecting light from said objective lens to said second mirror and said second mirror reflecting said light through said eyepiece and through an opening in the side of the enclosure so that when said pendulum member is at rest in equilibrium under the action of gravity a point which is vertically below the reference point will appear to be superimposed on said index mark as seen through the eyepiece.

2. An optical plummet for use with a surveying instrument to indicate when a reference point is vertically over a predetermined point comprising an enclosure, means for securing said enclosure to a surveying instrument, a pendulum member within said enclosure free to swing with respect to the reference point about a point near the top of said enclosure, a liquid in said enclosure for damping said pendulum member to bring it quickly to rest in its equilibrium position under the action of gravity, an objective lens carried by said pendulum member to image a point vertically below the reference point, a first mirror carried by said pendulum member at the focal point of said objective lens provided with an index mark and inclined to the optical axis of said objective lens, a second mirror carried by said pendulum member and an eyepiece carried by said pendulum member, said first mirror reflecting light from said objective lens to said second mirror and said second mirror reflecting said light through said eyepiece toward the side of the enclosure, a window in the bottom of said enclosure below said objective lens to permit light to reach said objective lens from below and a window in the side of said enclosure adjacent said eyepiece to permit the light directed through said eyepiece from said second mirror to reach the eye of an observer, so that when said pendulum member is at rest in equilibrium under the action of gravity, a point which is vertically below the reference point will appear to be superimposed on said index mark as seen through the eyepiece.

3. An optical plummet to indicate when a reference point is vertically over a predetermined point comprising a vertical elongated enclosure, said enclosure having a relatively small cross sectional area near the top gradually increasing into a relatively large cross sectional area near the bottom, a pendulum member within said enclosure free to swing with respect to the reference point about a point near the top of said enclosure, an objective lens carried at the bottom end of said pendulum member to image a point vertically below the reference point, a first reflector carried by said pendulum member above said objective lens at the focal point of said objective lens, said first reflector being provided with an index mark and being inclined to the optical axis of said objective lens, a second reflector carried by said pendulum member near the lower end thereof on one side of the optical axis of said objective, an eyepiece lens carried by said pendulum member near the lower end thereof on the other side of the optical axis of said objective from said second reflector, said first reflector reflecting light from said objective lens to said second reflector and said second reflector reflecting said light to said eyepiece, a window in the bottom of said enclosure below said objective lens to permit light to reach said objective lens from below and a window in the side of said enclosure near the bottom thereof adjacent said eyepiece to permit light from said eyepiece to reach the eye of an observer, so that when said pendulum member is at rest in equilibrium under the action of gravity, a point which is vertically below the reference point will appear to be superimposed on said index mark as seen through the eyepiece.

ALLISTER L. BAKER.

REFERENCES CITED

The following references are of record in the file of this patent:

UNITED STATES PATENTS

| Number | Name | Date |
| --- | --- | --- |
| 928,477 | Sloggett | July 20, 1909 |
| 940,329 | Krell | Nov. 16, 1909 |
| 973,062 | Mayo | Oct. 18, 1910 |
| 1,121,309 | Thompson | Dec. 15, 1914 |
| 1,448,289 | French | Mar. 13, 1923 |
| 1,722,209 | Gordon | July 23, 1929 |
| 1,891,641 | Habel | Dec. 30, 1932 |
| 2,193,512 | Hagner | Mar. 12, 1940 |

FOREIGN PATENTS

| Number | Country | Date |
| --- | --- | --- |
| 141,850 | Great Britain | Apr. 29, 1920 |
| 431,371 | Great Britain | July 5, 1935 |